(12) United States Patent
Schnelz

(10) Patent No.: US 9,637,241 B2
(45) Date of Patent: May 2, 2017

(54) ENGINE MOUNTING SYSTEM FOR AN AIRCRAFT

(75) Inventor: James Robert Schnelz, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 834 days.

(21) Appl. No.: 13/422,123

(22) Filed: Mar. 16, 2012

(65) Prior Publication Data

US 2013/0240666 A1 Sep. 19, 2013

(51) Int. Cl.
*B64D 27/00* (2006.01)
*B64D 27/26* (2006.01)

(52) U.S. Cl.
CPC ........ *B64D 27/26* (2013.01); *B64D 2027/266* (2013.01); *B64D 2027/268* (2013.01)

(58) Field of Classification Search
CPC .. B64D 27/26; B64D 2027/266; B64D 27/18; B64D 2027/268; B64D 29/06; B64D 27/12
USPC ..................................... 244/54; 60/796, 797
See application file for complete search history.

(56) References Cited

U.S. PATENT DOCUMENTS

| | | |
|---|---|---|
| 4,013,246 A | 3/1977 | Nightingale |
| 4,266,741 A | 5/1981 | Murphy |
| 4,428,189 A | 1/1984 | Greenberg et al. |
| 4,437,627 A | 3/1984 | Moorehead |
| 4,471,609 A | 9/1984 | Porter et al. |
| 4,603,821 A | 8/1986 | White |
| 5,078,342 A | 1/1992 | Langley et al. |
| 5,452,575 A | 9/1995 | Freid |
| 5,524,847 A | 6/1996 | Brodell et al. |
| 6,126,110 A * | 10/2000 | Seaquist ................ B64D 27/18 244/54 |
| 6,347,765 B1 | 2/2002 | Jule et al. |
| 6,474,597 B1 * | 11/2002 | Cazenave ............. B64D 27/18 244/54 |
| 7,770,840 B2 | 8/2010 | Diochon et al. |
| 7,971,825 B2 | 7/2011 | Diochon et al. |
| 7,971,826 B2 | 7/2011 | Journade et al. |
| 2009/0032673 A1 * | 2/2009 | Dron et al. .................. 248/557 |
| 2011/0001002 A1 * | 1/2011 | Chouard ............... B64D 27/26 244/54 |

(Continued)

FOREIGN PATENT DOCUMENTS

| | | |
|---|---|---|
| JP | H0687495 A | 3/1994 |
| JP | 2008509319 A | 3/2008 |

OTHER PUBLICATIONS

Notification of First Office Action, English Translation, Chinese Patent Application No. 2013100839163, dated Jan. 18, 2016, 7 pages.

(Continued)

*Primary Examiner* — Medhat Bagawi
*Assistant Examiner* — George Andonyan
(74) *Attorney, Agent, or Firm* — Yee & Associates, P.C.

(57) ABSTRACT

A method and apparatus comprising a frame, a first linking system connected to the frame, and a second linking system connected to the frame. The frame may be configured to be connected to a support structure for an engine of an aircraft. The first linking system may be configured to be connected to a fan case in the engine. The second linking system is configured to be connected to an engine core case in the engine.

25 Claims, 12 Drawing Sheets

(56) References Cited

U.S. PATENT DOCUMENTS

| | | | | |
|---|---|---|---|---|
| 2011/0121132 A1* | 5/2011 | Crook | ................... | B64D 27/18 244/54 |
| 2012/0119056 A1* | 5/2012 | Dunleavy et al. | ............ | 248/554 |
| 2012/0286125 A1* | 11/2012 | Marche | ................. | B64D 27/26 248/554 |
| 2013/0160459 A1* | 6/2013 | Thies | ....................... | F02C 7/32 60/796 |
| 2014/0217234 A1* | 8/2014 | Dezeustre | ............. | B64D 27/26 244/54 |

OTHER PUBLICATIONS

Notice of Reasons for Rejection and English Translation, regarding Japanese Patent Application No. 2013-051216, issued Jan. 10, 2017, 7 pages.

* cited by examiner

ENGINE MOUNTING SYSTEM FOR AN AIRCRAFT

BACKGROUND INFORMATION

1. Field

The present disclosure relates generally to aircraft and, in particular, to connecting aircraft parts. Still more particularly, the present disclosure relates to a method and apparatus for connecting an engine to an aircraft.

2. Background

Engines that provide propulsion for an aircraft may be attached to the wings of an aircraft. An engine that is attached to the wings of an aircraft may take the form of a turbofan. In particular, the turbofan may be a high-bypass turbofan.

These engines may be connected to the wing of an aircraft through a mounting system that mounts the engine under the wing of the aircraft. Mounting these engines higher relative to the wing may be desirable. When mounting these engines closer to the wing, an engine pylon may be used. An engine pylon may include a rigid support structure that is connected to both the wing and the engine and a fairing that is used to cover this support structure.

Typically, the support structure may be connected to the engine using a forward mounting system and an aft mounting system. The aft mounting system may be used to connect the support structure to an engine core case for the engine. The aft mounting system may be configured to carry side loads, vertical loads, and thrust loads.

The forward mounting system may be used to connect the support structure to a fan case for the engine. The forward mounting system may be configured to carry side loads and vertical loads. With some currently available forward mounting systems, the forward mounting system may be connected to a top portion of the fan case. With these types of forward mounting systems, the support structure may be mounted above the fan case of the engine higher than desired. Consequently, the engine may be mounted further away from the wing than desired.

Further, when the support structure is mounted above the fan case using these types of forward mounting systems, the configuration of the fairing used to cover the support structure may be larger than desired. This larger configuration for the fairing may result in a less than desired aerodynamic flow. For example, the height of the fairing may be higher than desired and may reduce a level of aerodynamic performance. As a result, the fuel efficiency of the aircraft may be reduced.

Therefore, it would be desirable to have a method and apparatus that takes into account at least some of the issues discussed above as well as possibly other issues.

SUMMARY

In one illustrative embodiment, an apparatus may comprise a frame, a first linking system connected to the frame, and a second linking system connected to the frame. The frame may be configured to be connected to a support structure for an engine of an aircraft. The first linking system may be configured to be connected to a fan case in the engine. The second linking system may be configured to be connected to an engine core case in the engine.

In another illustrative embodiment, a method for operating an engine may be present. The engine connected to a wing of an aircraft by a mounting system having a frame, a first linking system connected to the frame and a fan case in the engine, and a second linking system connected to the frame and an engine core case in the engine may be operated. A number of side loads may be carried using the first linking system. A second number of loads may be carried using the second linking system.

In yet another illustrative embodiment, an aircraft engine mounting system may comprise a frame, a first linking system connected to the frame, a second linking system connected to the frame, a bracket, a bar, and a number of brackets. The frame may be configured to be connected to a support structure in an engine pylon for an engine of an aircraft. The frame may have a first end configured to be connected to the support structure for the engine of the aircraft and a second end configured to be connected to a first linking system. The frame may comprise a first connector section at the first end of the frame, a second connector section at the second end of the frame, and a number of elongate members extending from the first connector section to the second connector section. The first linking system may be configured to be connected to a fan case in the engine. The first linking system may comprise a fixed link and a floating link. The first linking system may further be configured to carry a number of side loads in a first direction that is substantially parallel to a pitch axis through the aircraft. The second linking system may be configured to be connected to an engine core case in the engine. The second linking system may further be configured to carry a number of vertical loads in a second direction that is substantially parallel to a yaw axis through the aircraft. The bracket may be configured to connect the first linking system to the fan case. The bar may be configured to connect the second linking system to the frame. The number of brackets may be configured to connect the second linking system to the engine core case. The frame, the first linking system, and the second linking system may be comprised of a number of materials selected from one of titanium, steel, and a steel alloy.

In yet another illustrative embodiment, a method for operating an engine may be present. The engine connected to an engine pylon of a wing of an aircraft by a forward mounting system having a frame, a first linking system connected to the frame and a fan case in the engine, and a second linking system connected to the frame and an engine core case in the engine may be operated. The frame may have a first end configured to be connected to a support structure for the aircraft engine and a second end configured to be connected to the first linking system. The frame may comprise a first connector section at the first end, a second connector section at the second end, and a number of elongate members extending from the first connector section to the second connector section. A number of side loads may be carried using the first linking system. A bracket may connect the first linking system to the fan case. A number of vertical loads may be carried using the second linking system. A number of brackets may be configured to connect the second linking system to the engine core case.

The features, functions, and advantages may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. The different illustrative embodiments recognize and take into account that the configuration of the support structure of an engine pylon may result in an undesired configuration for a fairing of the engine pylon when the support structure is connected to a fan case using some currently available forward mounting systems.

In particular, the different illustrative embodiments recognize and take into account that the support structure may be longer and taller than desired when a forward mounting system is used to connect a forward end of the support structure to the top of a fan case for an engine. As the length and height of the support structure increases, the size of the fairing used to cover the support structure may also increase in an undesired manner. A smaller fairing may be capable of reducing drag more than a larger fairing. Reducing drag may increase the aerodynamic performance of the aircraft.

The different illustrative embodiments recognize and take into account that the forward end of the support structure may be connected to the engine core case instead of the fan case. This type of connection may allow for the fairing to be smaller than when the engine pylon is connected to the fan case.

However, the different illustrative embodiments recognize and take into account that connecting the forward end of the support structure to the engine core case may be undesirable when a pre-cooler is present. When the forward end of the support structure is connected to the engine core case, the support structure may be angled or curved toward the engine core case. The shape of the support structure may not provide sufficient space for a pre-cooler. Thus, the different illustrative embodiments recognize and take into account that it may be desirable to have a forward mounting system that is configured to connect a forward end of the support structure of an engine pylon to the fan case of an engine in a manner such that the support structure may have a desired shape and size.

Thus, one or more of the illustrative embodiments provide a method and apparatus for connecting an engine to an aircraft. In one illustrative embodiment, an aircraft system may comprise a frame, a first linking system, and a second linking system. The frame may have a first end associated with a support structure for an engine of an aircraft and a second end configured to be connected to a linking system associated with a fan case of an engine for the aircraft. The second linking system may have a first end associated with the frame and a second end configured to be connected to an engine core case in the engine.

Figure 1:
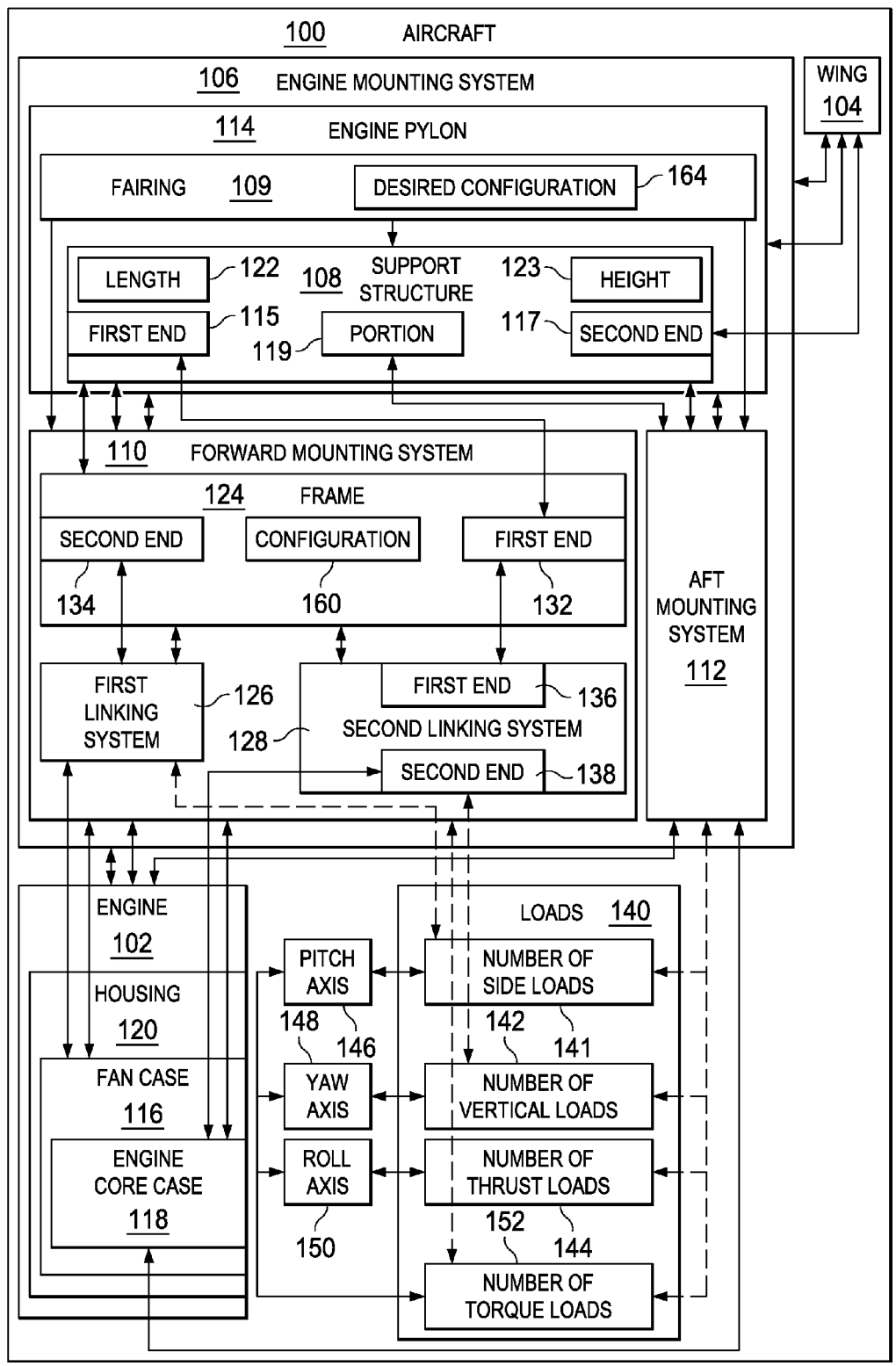
FIG. 1 is an illustration of a block diagram of an aircraft in accordance with an illustrative embodiment.

With reference now to FIG. 1, an illustration of a block diagram of an aircraft is depicted in accordance with an illustrative embodiment. In this illustrative example, aircraft 100 may include engine 102. Engine 102 may be implemented using a number of different types of engines. Engine 102 may be selected from one of, for example, without limitation, a rotary engine, a radial engine, a turboprop, a turbojet, a turbofan, a high-bypass turbofan, a low-bypass turbofan, an ultra-high bypass turbofan, and other suitable types of engines for use with aircraft 100.

In these illustrative examples, engine 102 may have housing 120. Housing 120 may be referred to as a "nacelle." As depicted, engine 102 may have fan case 116 and engine core case 118 located within housing 120 of engine 102.

In these illustrative examples, engine 102 may be connected to wing 104 on aircraft 100 using engine mounting system 106. As depicted, engine mounting system 106 may include engine pylon 114, forward mounting system 110, and aft mounting system 112. Forward mounting system 110 and aft mounting system 112 may connect engine 102 to engine pylon 114, which may be connected to wing 104.

As used herein, a first component, such as engine pylon 114, "connected to" a second component, such as wing 104, means that the first component may be connected directly or indirectly to the second component. In other words, additional components may be present between the first component and the second component. The first component may be considered to be indirectly connected to the second component when one or more additional components may be present between the two components. When the first component is directly connected to the second component, no additional components are present between the two components.

Additionally, a first component may be connected to a second component in a number of different ways. For example, without limitation, a first component may be connected to a second component using a number of fasteners, an adhesive, or some other suitable mechanism for connecting components to each other.

In these illustrative examples, engine pylon 114 may include support structure 108 and fairing 109. Support structure 108 may have first end 115 and second end 117. First end 115 may be a forward end of support structure 108, and second end 117 may be a second end of support structure 108. Second end 117 of support structure 108 may be connected to wing 104. Forward mounting system 110 and aft mounting system 112 may be connected to engine 102 and different portions of support structure 108.

As depicted, aft mounting system 112 may be configured to connect portion 119 of support structure 108 to engine core case 118 of engine 102. Portion 119 of support structure 108 may be located aft of first end 115 of support structure 108. In some cases, portion 119 of support structure 108 may be second end 117 of support structure 108.

In these illustrative examples, forward mounting system 110 may comprise frame 124, first linking system 126, second linking system 128, and, in some cases, other suitable components. Frame 124, first linking system 126, and second linking system 128 may be comprised of a number of materials selected from at least one of titanium, steel, a steel alloy, and other suitable materials.

Frame 124 may have first end 132 and second end 134. In these illustrative examples, first end 132 of frame 124 may be connected to first end 115 of support structure 108. In some cases, first end 132 of frame 124 may be connected to a location on support structure 108 proximate to first end 115 of support structure 108. First linking system 126 may be connected to second end 134 of frame 124 and fan case 116.

Second linking system 128 may be connected to frame 124 and engine core case 118. In one illustrative example, second linking system 128 may be connected to first end 132 of frame 124. In particular, first end 136 of second linking system 128 may be connected to engine core case 118, while second end 138 of second linking system 128 may be connected to first end 132 of frame 124.

In these illustrative examples, forward mounting system 110 and aft mounting system 112 may be configured to carry loads 140. Loads 140 may include loads that result from support structure 108 being connected to engine 102. Carrying loads 140 may also be referred to as "reacting" loads in these illustrative examples.

Forward mounting system 110 and aft mounting system 112 may carry loads 140. Loads 140 include number of side loads 141, number of vertical loads 142, and number of thrust loads 144. As used herein, a "number of" means one or more items. For example, number of side loads 141 may be one or more side loads.

As used herein, a "side load", such as one of number of side loads 141, may be a load in a direction that is substantially parallel to pitch axis 146 through aircraft 100. In other words, a side load may be a load in a direction that is either inboard towards aircraft 100 or outboard away from aircraft 100.

Further, as used herein, a "vertical load", such as one of number of vertical loads 142, may be a load in a direction that is substantially parallel to yaw axis 148 through aircraft 100. In other words, a vertical load may be a load in a direction that is either up or down relative to aircraft 100.

As used herein, a "thrust load", such as one of number of thrust loads 144, may be a load in a direction that is substantially parallel to roll axis 150 through aircraft 100. In other words, a thrust load may be a load in a direction that is either towards a forward end of aircraft 100 or an aft end of aircraft 100.

Aft mounting system 112 may be configured to carry number of side loads 141, number of vertical loads 142, and number of thrust loads 144. First linking system 126 of forward mounting system 110 may be configured to carry number of side loads 141. Second linking system 128 of forward mounting system 110 may be configured to carry number of vertical loads 142. In some cases, second linking system 128 may also be configured to carry number of thrust loads 144.

Additionally, with forward mounting system 110 connecting fan case 116 of engine 102 to first end 115 of support structure 108 and aft mounting system 112 connecting engine core case 118 of engine 102 to portion 119 of support structure 108, forward mounting system 110 and aft mounting system 112 may also carry number of torque loads 152. As used herein, a "torque load" may be a load in a direction around one of pitch axis 146, yaw axis 148, or roll axis 150.

In this manner, engine mounting system 106 may be configured to reduce and/or prevent movement of engine 102. More specifically, engine mounting system 106 may constrain movement of engine 102 with respect to six degrees of freedom when engine 102 is mounted to wing 104 using engine mounting system 106. The six degrees of freedom may include movement of engine 102 in a direction along pitch axis 146, yaw axis 148, and roll axis 150 and rotation of engine 102 about pitch axis 146, yaw axis 148, and roll axis 150.

In these illustrative examples, forward mounting system 110 may be configured such that length 122 and height 123 of support structure 108 may be reduced in accordance with an illustrative embodiment. For example, without limitation, by being configured to only carry number of side loads 141 in these examples, first linking system 126 connected to fan case 116 may have a smaller size than a linking system configured to carry both number of side loads 141 and number of vertical loads 142.

In particular, first linking system 126 may have a reduced height above fan case 116 as compared to a linking system configured to carry both number of side loads 141 and number of vertical loads 142. In this manner, height 123 of support structure 108 may be reduced. Further, frame 124 may connect first linking system 126 to support structure 108 in a manner that allows the height of support structure 108 above fan case 116 to be reduced.

Additionally, by using second linking system 128 to connect support structure 108 to engine core case 118 instead of to fan case 116, length 122 of support structure 108 may be reduced. In particular, support structure 108 may have length 122 that does not need to extend up to fan case 116. Further, second linking system 128 may connect support structure 108 to engine core case 118 in a manner such that sufficient room may be present for a pre-cooler.

With the distribution of loads 140 using first linking system 126 and second linking system 128, frame 124 may have configuration 160 that allows for fairing 109 to cover at least one of support structure 108, forward mounting system 110, aft mounting system 112, and other suitable components. Configuration 160 may include, for example, without limitation, a shape, a size, a number of dimensions, and/or other suitable parameters for frame 124.

With the reduction in length 122 and height 123 for support structure 108 allowed by using forward mounting system 110 and aft mounting system 112 and configuration 160 for frame 124, fairing 109 may have desired configuration 164. For example, without limitation, desired configuration 164 may include a shape, a size, a number of dimensions, an aerodynamic property, and/or other suitable parameters for fairing 109. In these illustrative examples, desired configuration 164 for fairing 109 may be a configuration that allows fairing 109 to provide a desired reduction in drag, while allowing engine 102 to be mounted closer to wing 104.

The illustration of aircraft 100 with engine mounting system 106 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more additional engines may be present in aircraft 100 in addition to engine 102 that may be mounted using a mounting system, such as engine mounting system 106. In yet another illustrative example, additional components, such as fasteners, or other connecting mechanisms for connecting components, such as frame 124, first linking system 126, second linking system 128, and other suitable components in aircraft 100, may be present.

Figure 2:
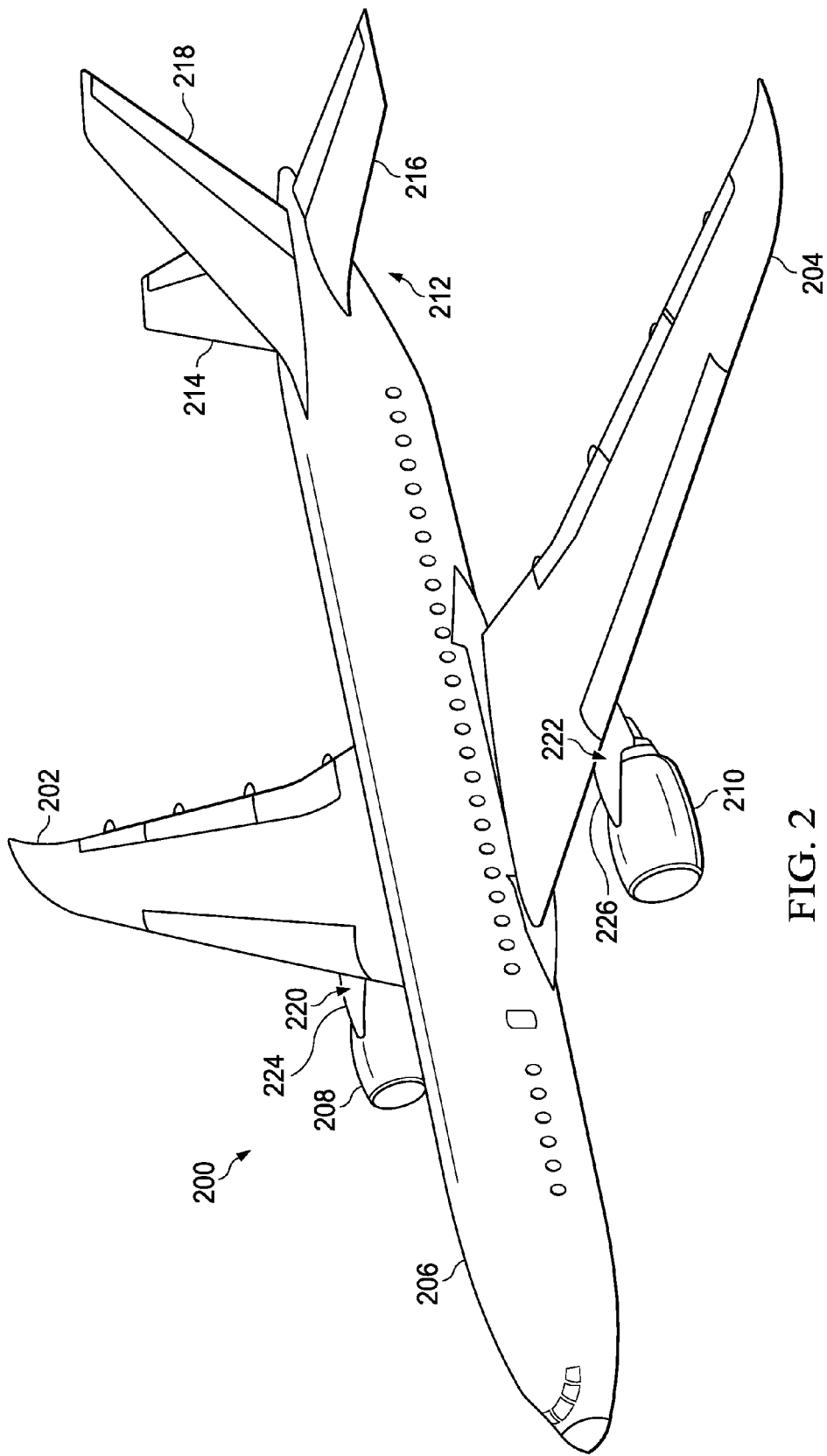
FIG. 2 is an illustration of an aircraft in accordance with an illustrative embodiment.

With reference next to FIG. 2, an illustration of an aircraft is depicted in accordance with an illustrative embodiment. In this illustrative example, aircraft 200 is an example of one implementation for aircraft 100 illustrated in block form in FIG. 1.

As depicted, aircraft 200 may have wing 202 and wing 204 attached to fuselage 206. Aircraft 200 also may include engine 208 attached to wing 202 and engine 210 attached to wing 204. As depicted, fuselage 206 may have tail section 212. Horizontal stabilizer 214, horizontal stabilizer 216, and vertical stabilizer 218 may be attached to tail section 212 of fuselage 206.

In these illustrative examples, engine 208 may be attached to wing 202 using engine mounting system 220. Engine 210 may be attached to wing 204 using engine mounting system 222. Engine mounting system 220 and engine mounting system 222 may be examples of one implementation for engine mounting system 106 in FIG. 1.

As depicted, engine mounting system 220 may include engine pylon 224, and engine mounting system 222 may include engine pylon 226. Engine pylon 224 and engine pylon 226 may be examples of one implementation for engine pylon 114 in FIG. 1. Engine mounting system 220 and engine mounting system 222 may be configured such that engine pylon 224 and engine pylon 226, respectively, have a reduced size that allows engine 208 and engine 210, respectively, to be attached closer to wing 202 and wing 204, respectively.

With reference now to FIGS. 3-14, detailed illustrations of engine mounting system 222 in FIG. 2 and the different components in engine mounting system 222 are depicted in accordance with an illustrative embodiment. Further, different views of engine mounting system 222 are depicted in these figures.

Figure 3:
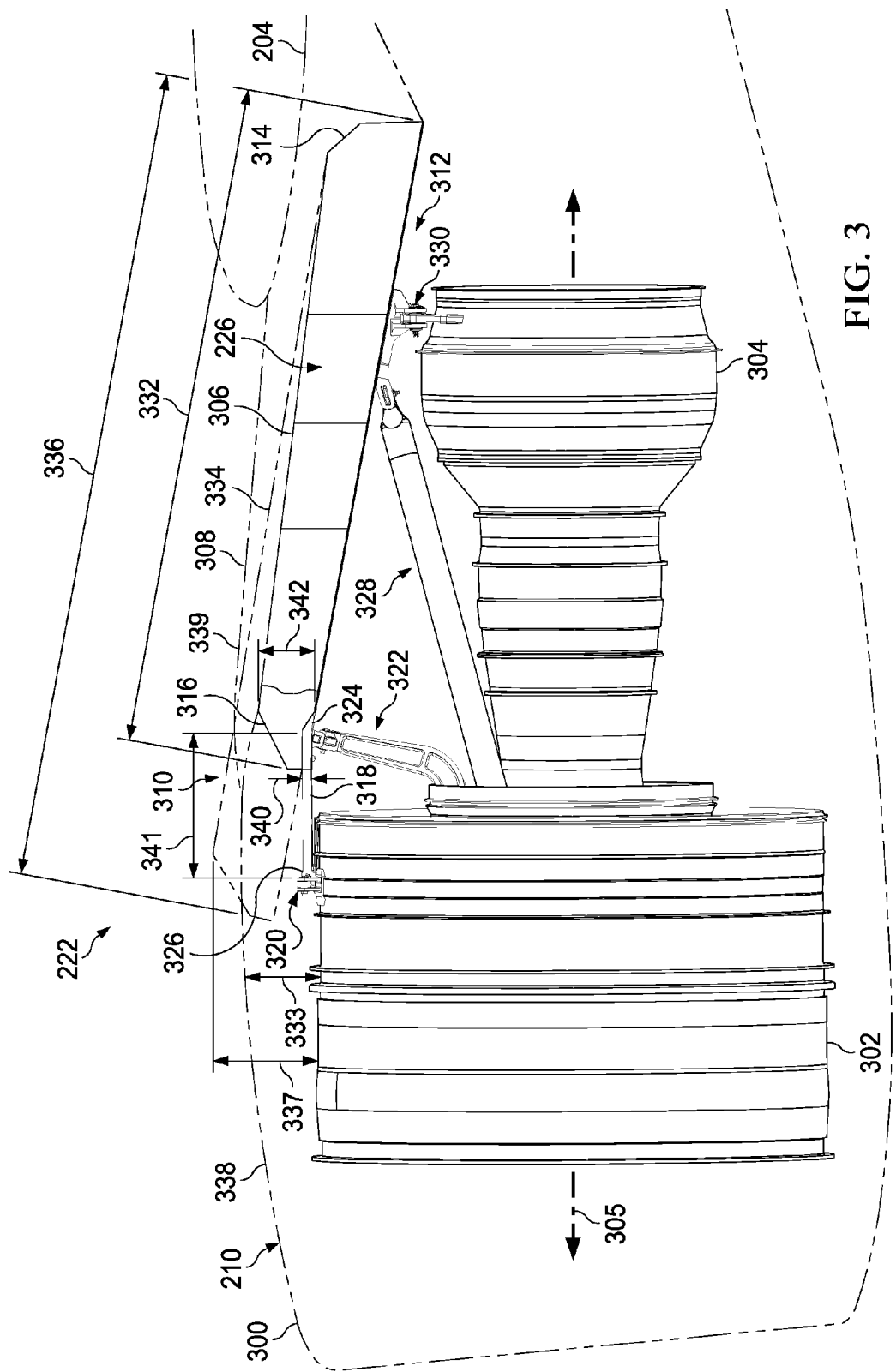
FIG. 3 is an illustration of a partially-exposed side view of an engine mounting system for mounting an engine to a wing in accordance with an illustrative embodiment.

Turning now to FIG. 3, a partially-exposed side view of engine mounting system 222 for mounting engine 210 to wing 204 is depicted in accordance with an illustrative embodiment. As depicted, housing 300 for engine 210 is shown in phantom.

In this view, fan case 302 and engine core case 304 may be seen within housing 300. As depicted, fan case 302 and engine core case 304 may be aligned with respect to axis 305. In other words, fan case 302 and engine core case 304 may be arranged such that axis 305 extends centrally through each of these components. In this manner, fan case 302 and engine core case 304 may be substantially concentric to each other.

Engine mounting system 222 may be connected to both fan case 302 and engine core case 304. In these illustrative examples, engine mounting system 222 may include engine pylon 226, forward mounting system 310, and aft mounting system 312. As described previously, engine pylon 226 may be an example of one implementation for engine pylon 114 in FIG. 1. Forward mounting system 310 may be an example of one implementation for forward mounting system 110 in FIG. 1. Aft mounting system 312 may be an example of one implementation for aft mounting system 112 in FIG. 1.

Engine pylon 226 may include support structure 306 and fairing 308. Support structure 306 may be an example of one implementation for support structure 108 in FIG. 1. Support structure 306 may have first end 314 and second end 316. First end 314 may be connected to wing 204. Fairing 308 may be an example of one implementation for fairing 109 in FIG. 1.

In these illustrative examples, forward mounting system 310 may be connected to second end 316 of support structure 306 or to a location on support structure 306 proximate to second end 316 of support structure 306. Forward mounting system 310 may be connected to support structure 306 closer to second end 316 of support structure 306 than to first end 314 of support structure 306. Aft mounting system 312 may be connected closer to first end 314 of support structure 306 than to second end 316 of support structure 306.

Forward mounting system 310 may include frame 318, first linking system 320, and second linking system 322. Frame 318, first linking system 320, and second linking system 322 may be examples of implementations for frame 124, first linking system 126, and second linking system 128 in FIG. 1, respectively.

In these illustrative examples, frame 318 may have first end 324 and second end 326. First end 324 may be connected to support structure 306. Second end 326 may be connected to first linking system 320. Additionally, first end 324 also may be connected to second linking system 322.

In these illustrative examples, with this configuration for forward mounting system 310, length 332 of support structure 306, height 333 of support structure 306 relative to fan case 302, or both may be reduced as compared to support structure 334, which is shown in phantom. Support structure 334 may be an example of the support structure that may be used when a different type of forward mounting system (not shown) is used to connect support structure 334 only to fan case 302 and not to engine core case 304 in these illustrative examples. Support structure 334 has length 336, which may be longer than length 332. Further, height 333 for support structure 306 may be shorter than height 337 of support structure 334.

In this illustrative example, support structure 334 may extend above surface 338 of housing 300. As can be seen, support structure 334 may extend above fairing 308 in this illustrative example.

Thus, if support structure 334 with a different forward mounting system (not shown) is used instead of support structure 306 with forward mounting system 310, fairing 308 may need to be increased in height and may have an undesired configuration (not shown). This undesired configuration may not provide desired aerodynamic properties for aircraft 200 in FIG. 2.

When support structure 306 is used with forward mounting system 310, support structure 306 may not extend above surface 338 of housing 300. As a result, with the use of support structure 306 and forward mounting system 310, configuration 339 of fairing 308 may be more desirable. For example, without limitation, fairing 308 may have a smaller size, a more aerodynamic configuration, or both as compared to the use of support structure 334 without forward mounting system 310.

As can be seen in this illustrative example, the use of frame 318 may allow support structure 306 to have length 332, which is less than length 336 for support structure 306. With length 332, support structure 306 may not extend above surface 338 of housing 300 for engine 210. In these illustrative examples, frame 318 may have height 340 and length 341. A reduction of height 340, as compared to height 342 for support structure 306, may be depicted in this illustrative example.

Figure 4:
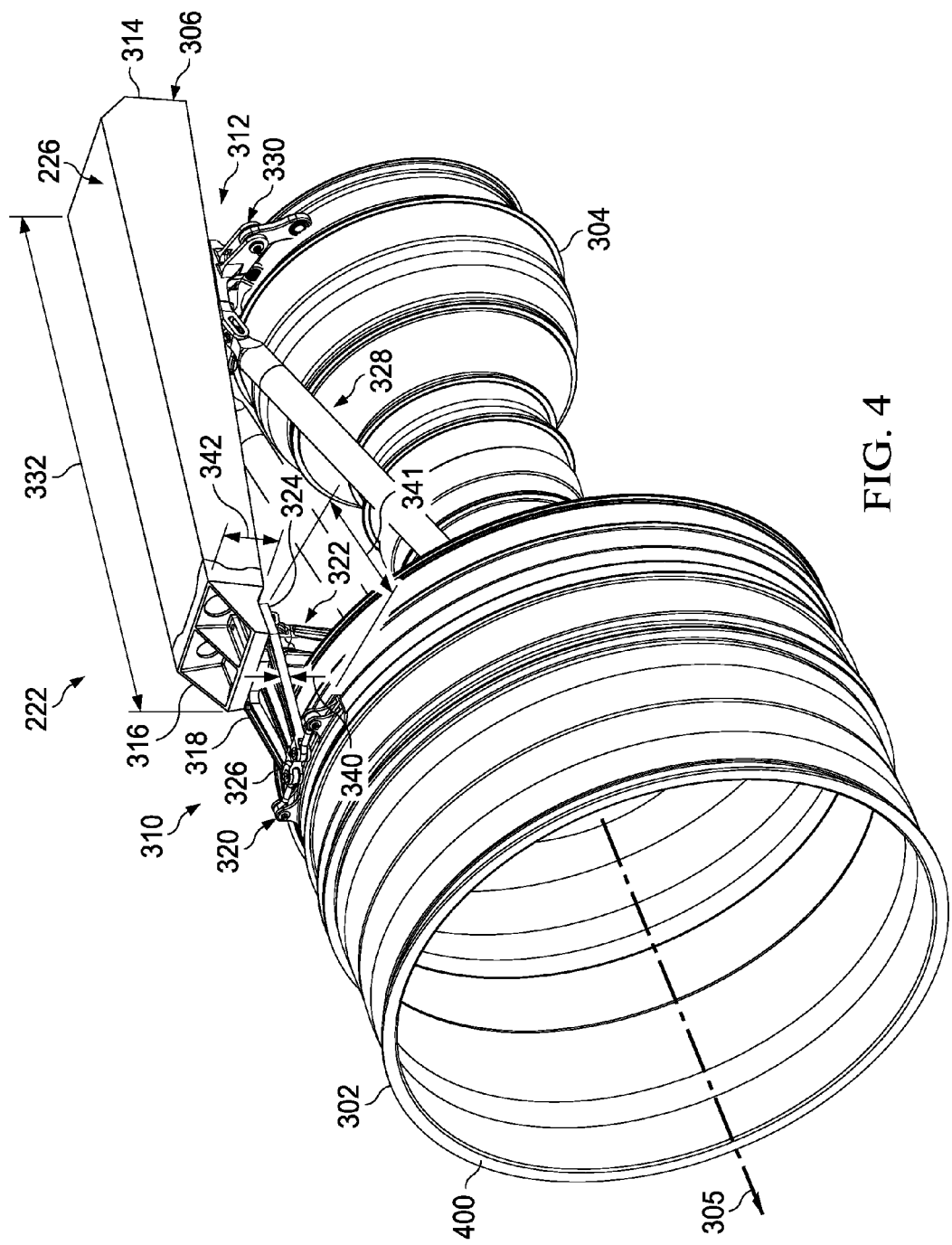
FIG. 4 is an illustration of an isometric view of an engine mounting system for connecting an engine to a wing in accordance with an illustrative embodiment.

With reference now to FIG. 4, an illustration of an isometric view of an engine mounting system for connecting an engine to a wing is depicted in accordance with an illustrative embodiment. In this example, a view of front end 400 of fan case 302 is seen with first linking system 320 connected to frame 318.

Figure 5:
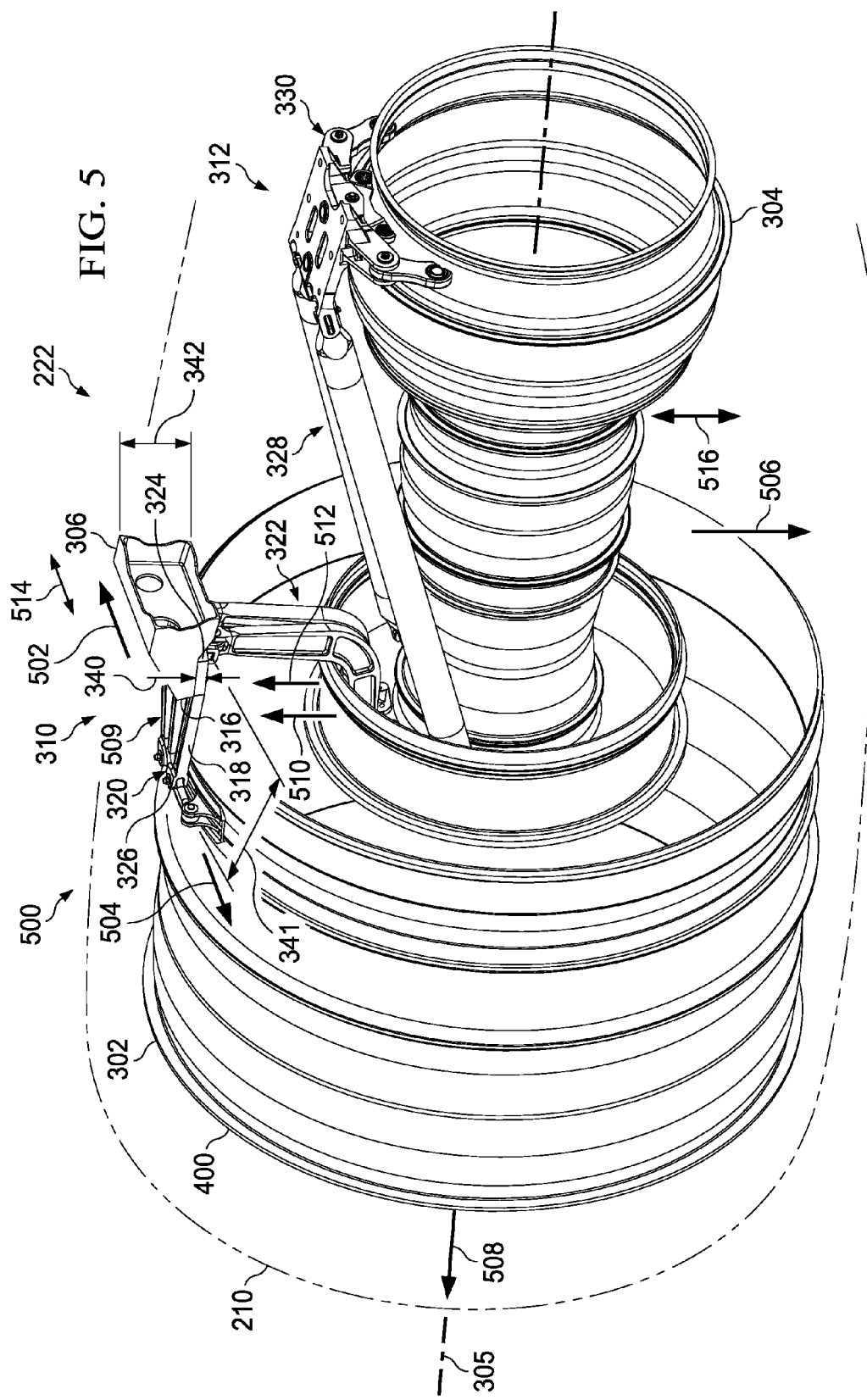
FIG. 5 is an illustration of an isometric view of an engine mounting system for connecting an engine to a wing showing load vectors in accordance with an illustrative embodiment.

Turning next to FIG. 5, an illustration of an isometric view of an engine mounting system for connecting an engine to a wing showing load vectors is depicted in accordance with an illustrative embodiment. In this depicted view, loads 500 are illustrated. Loads 500 may be an example of loads 144 in FIG. 1.

In this illustrative example, loads 500 may include vertical load 506, thrust load 508, side load 502, side load 504, vertical load 510, and vertical load 512. Vertical load 506 may be generated by the weight of engine 210. Thrust load 508 may occur in response to operation of engine 210.

Side load 502 and side load 504 may be reaction loads in these illustrative examples. As depicted, side load 502 and side load 504 may be carried by at least one of first linking system 320 and frame 318. These loads may be transferred by first linking system 320 and frame 318 to support structure 306. In these illustrative examples, number of elongate members 509 in frame 318 may carry side load 502 and side load 504 but not vertical load 510 and vertical load 512.

In this illustrative example, vertical load 510 and vertical load 512 may be carried by second linking system 322 and frame 318. Vertical load 510 and vertical load 512 may be carried at first end 324 of frame 318 and not by number of elongate members 509. Vertical load 510 and vertical load 512 may be transferred to support structure 306 in these illustrative examples. Of course, other loads may be present that may be carried and transferred by forward mounting system 310, aft mounting system 312, or a combination of the two.

In this depicted example, height 340 for frame 318 may be smaller than height 342 for support structure 306, because first linking system 320 and frame 318 may be used to carry only side load 502 and side load 504 and not vertical load 510 and vertical load 512.

In these illustrative examples, vertical load 510 and vertical load 512 may be carried by second linking system 322. By splitting the type of loads carried between frame 318, first linking system 320, and second linking system 322, height 340 of frame 318 may be reduced as compared to height 342 of support structure 306. Support structure 306, in this illustrative example, may carry side load 502, side load 504, vertical load 510, and vertical load 512.

In this illustrative example, side load 502 and side load 504 may be loads in a direction substantially parallel to axis 514. Axis 514 may be substantially perpendicular to axis 305 extending centrally through fan case 302 and engine core case 304. In these illustrative examples, vertical load 510 and vertical load 512 may be in a direction substantially parallel to axis 516. Axis 516 may be substantially perpendicular to axis 305 and may be substantially perpendicular to axis 514.

Figure 6:
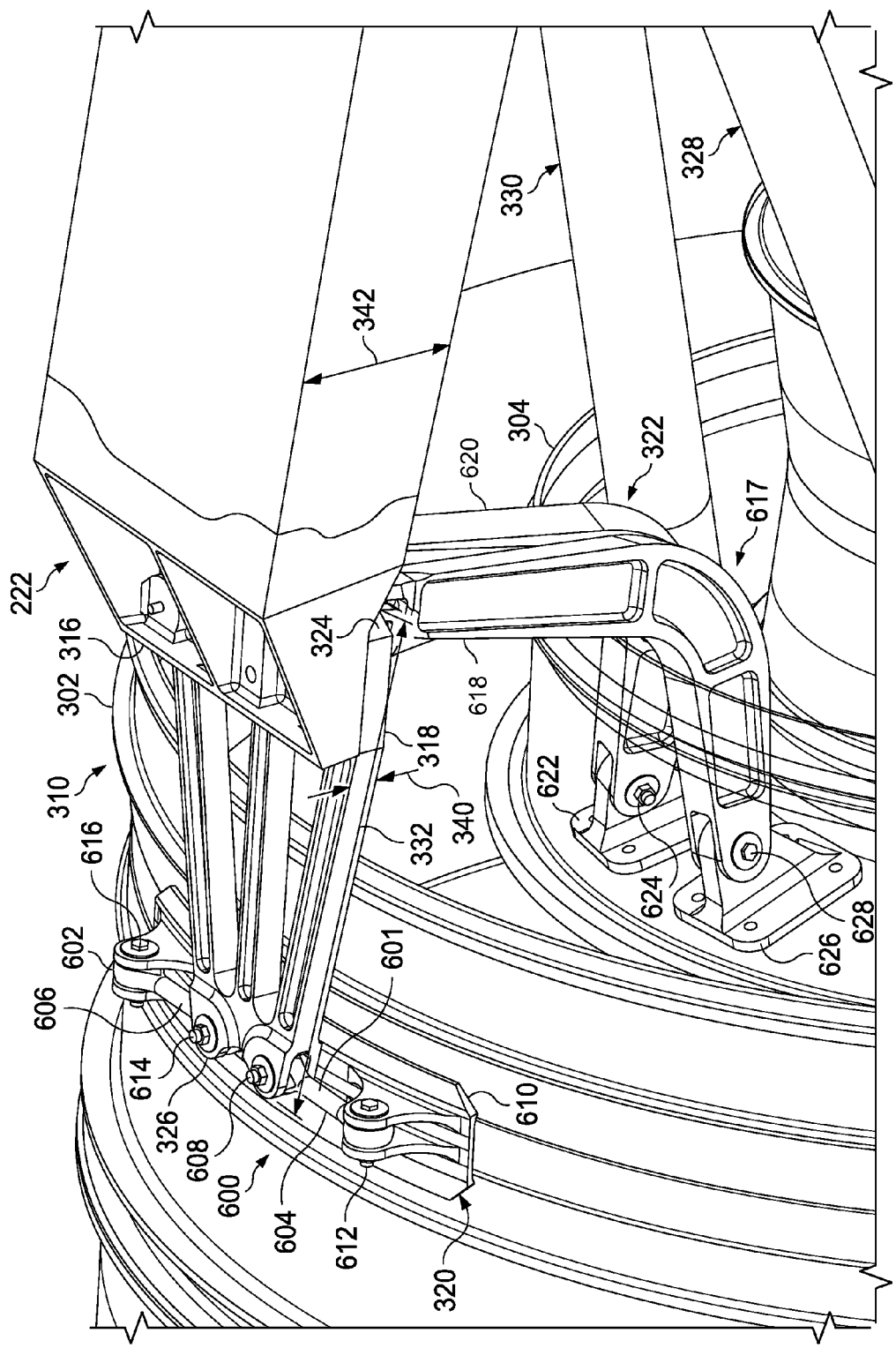
FIG. 6 is a more-detailed illustration of a portion of a forward mounting system connected to a mounting structure and a fan case in accordance with an illustrative embodiment.

Turning now to FIG. 6, a more-detailed illustration of a portion of a forward mounting system connected to a mounting structure and a fan case may be depicted in accordance with an illustrative embodiment. In this particular example, second end 326 of frame 318 may be connected to number of links 600 in first linking system 320. As shown in this figure, number of links 600 may comprise link 601 and link 602.

In this illustrative example, link 601 may be fixed link 604, while link 602 may be floating link 606. As depicted, fixed link 604 may be connected to second end 326 of frame 318 by fastener 608.

Fixed link 604 may be connected to bracket 610 by fastener 612. Floating link 606 may be connected to second end 326 of frame 318 by fastener 614. Floating link 606 also may be connected to bracket 610 by fastener 616.

In these illustrative examples, fastener 616 may have a smaller size than fastener 612. By using a smaller size for fastener 616, floating link 606 may be moveable. In particular, floating link 606 may be loosely connected to second end 326 of frame 318 using fastener 616 such that this portion of floating link 606 does not carry loads during normal operation. Fastener 616 may be used to provide a loose connection such that this connection may function as a backup connection for floating link 606 and frame 318.

Also, second linking system 330 may include number of links 617. Number of links 617 may comprise link 618 and link 620 in these illustrative examples. Link 618 may be connected to frame 318 (connection not shown) and engine core case 304.

The connection to engine core case 304 may be made indirectly through a connection to bracket 622. In particular, link 618 may be connected to bracket 626 by fastener 628. As depicted, link 620 also may be connected to engine core case 304 indirectly through bracket 622. In particular, link 620 may be connected to bracket 622 through fastener 624 in these illustrative examples.

Figure 7:
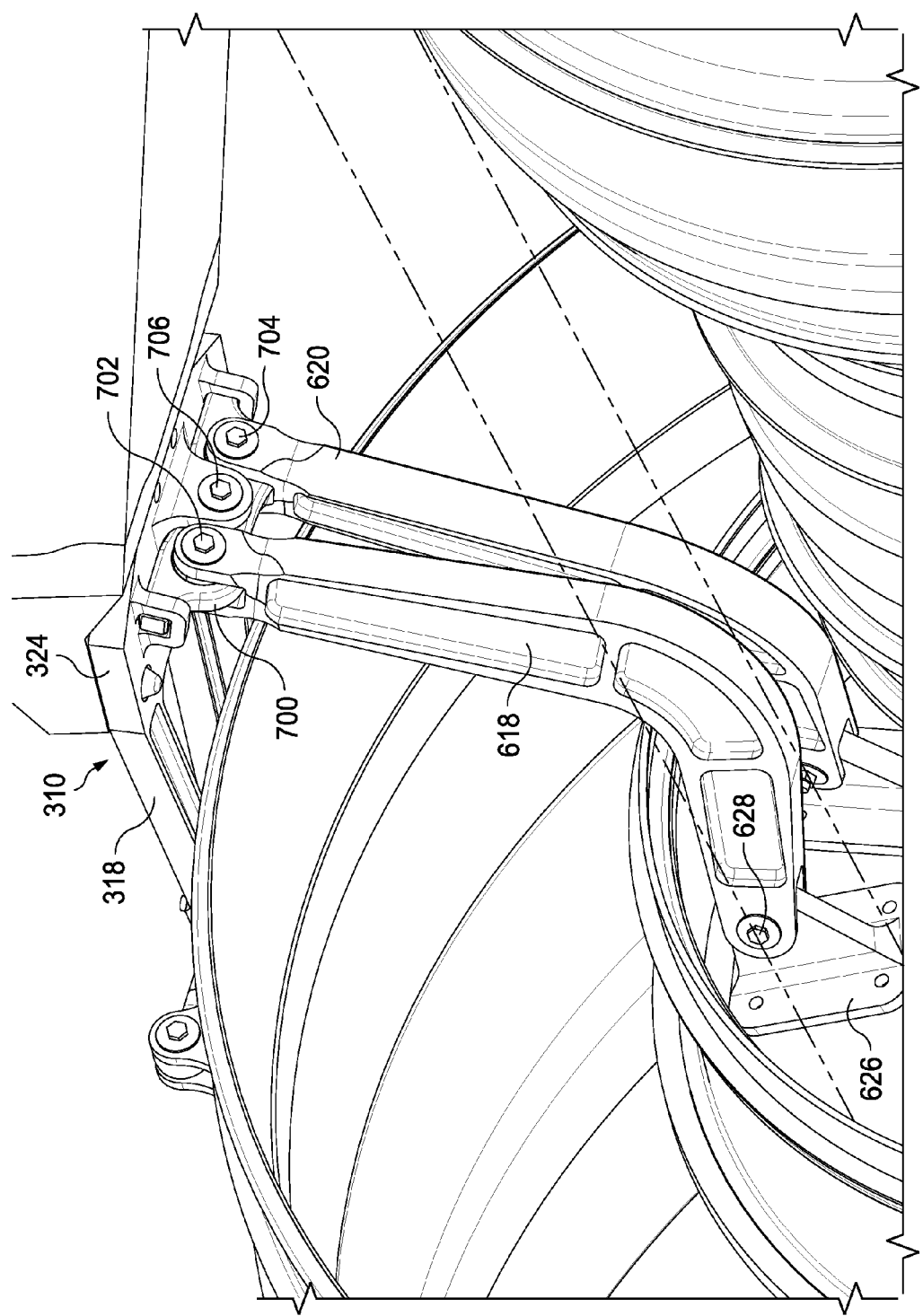
FIG. 7 is another illustration of a forward mounting system in accordance with an illustrative embodiment.

With reference now to FIG. 7, another illustration of forward mounting system 310 is depicted in accordance with an illustrative embodiment. In this illustrative example, link 618 and link 620 may be connected to first end 324 of frame 318. This connection may be an indirect connection through bar 700. In this illustrative example, link 618 may be connected to bar 700 through fastener 702. Link 620 may be connected to bar 700 using fastener 704. Bar 700 may be connected to first end 324 of frame 318 using fastener 706.

Figure 8:
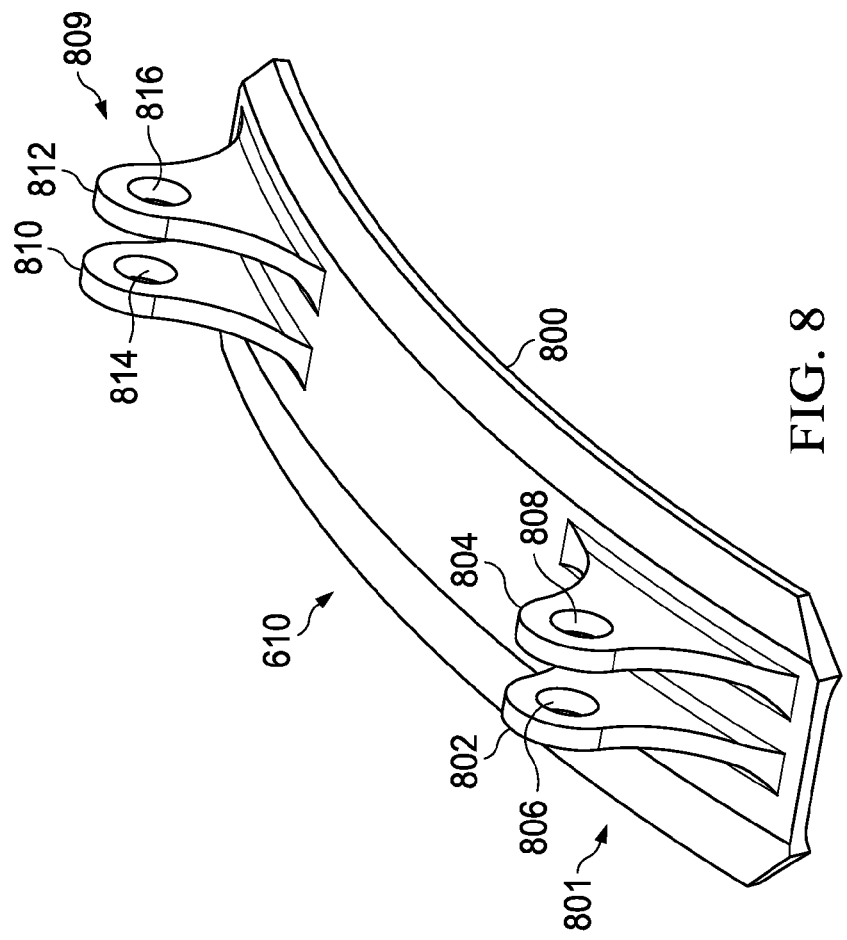
FIG. 8 is an illustration of a bracket in accordance with an illustrative embodiment.

Turning now to FIG. 8, an illustration of a bracket is depicted in accordance with an illustrative embodiment. In this illustrative example, bracket 610 may have curved shape 800 that may be configured to substantially conform to the surface of fan case 302 (not shown).

In this illustrative example, bracket 610 may be connected to fan case 302 in a number of different ways. For example, without limitation, bracket 610 may be connected to fan case 302 using adhesive, welds, fasteners, and other suitable mechanisms. In some illustrative examples, bracket 610 may be formed as part of fan case 302.

In these illustrative examples, bracket 610 may include clevis 801. Clevis 801 may be configured to be connected to fixed link 604 in FIG. 6. In this illustrative example, clevis 801 may include flange 802 and flange 804. Flange 802 may have hole 806, and flange 804 may have hole 808.

Additionally, bracket 610 also may have clevis 809 that is configured to be connected to floating link 606 in FIG. 6. As depicted, clevis 809 may comprise flange 810 and flange 812. These flanges may be configured to receive floating link 606. In particular, flange 810 may have hole 814, and flange 812 may have hole 816. Hole 814 and hole 816 may be configured to receive fastener 614 in FIG. 6.

Figure 9:
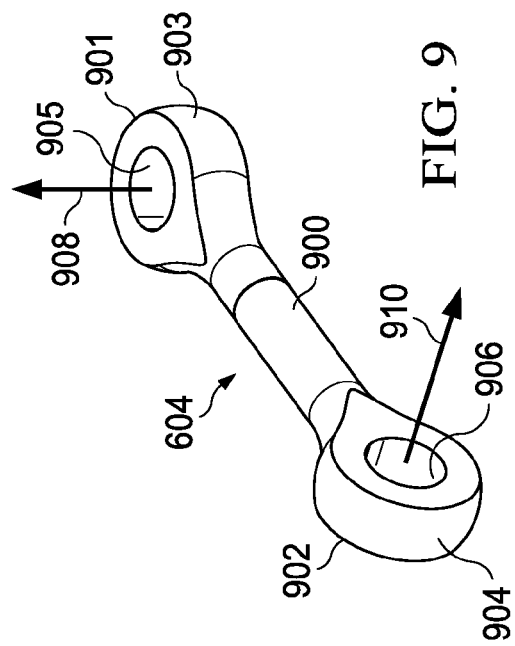
FIG. 9 is an illustration of a link in a first linking system in accordance with an illustrative embodiment.

Turning now to FIG. 9, an illustration of a link in a first linking system is depicted in accordance with an illustrative embodiment. In this illustrative example, a more-detailed view of fixed link 604 is depicted.

In this illustrative example, fixed link 604 may be elongate member 900 having first end 901 and second end 902. Connector 903 at first end 901 may be configured to be connected to second end 326 of frame 318 in FIG. 3. Connector 904 at second end 902 may be configured to be connected to flange 802 and flange 804 on bracket 610 in FIG. 8.

In this illustrative example, connector 903 may have hole 905, and connector 904 may have hole 906. As depicted, hole 905 may be oriented in direction 908, and hole 906 may be oriented in direction 910. Direction 908 may be substantially about 90 degrees with respect to direction 910 in these illustrative examples. Although not shown in this example, floating link 606 may have a similar configuration to fixed link 604 as illustrated in FIG. 9.

Figure 10:
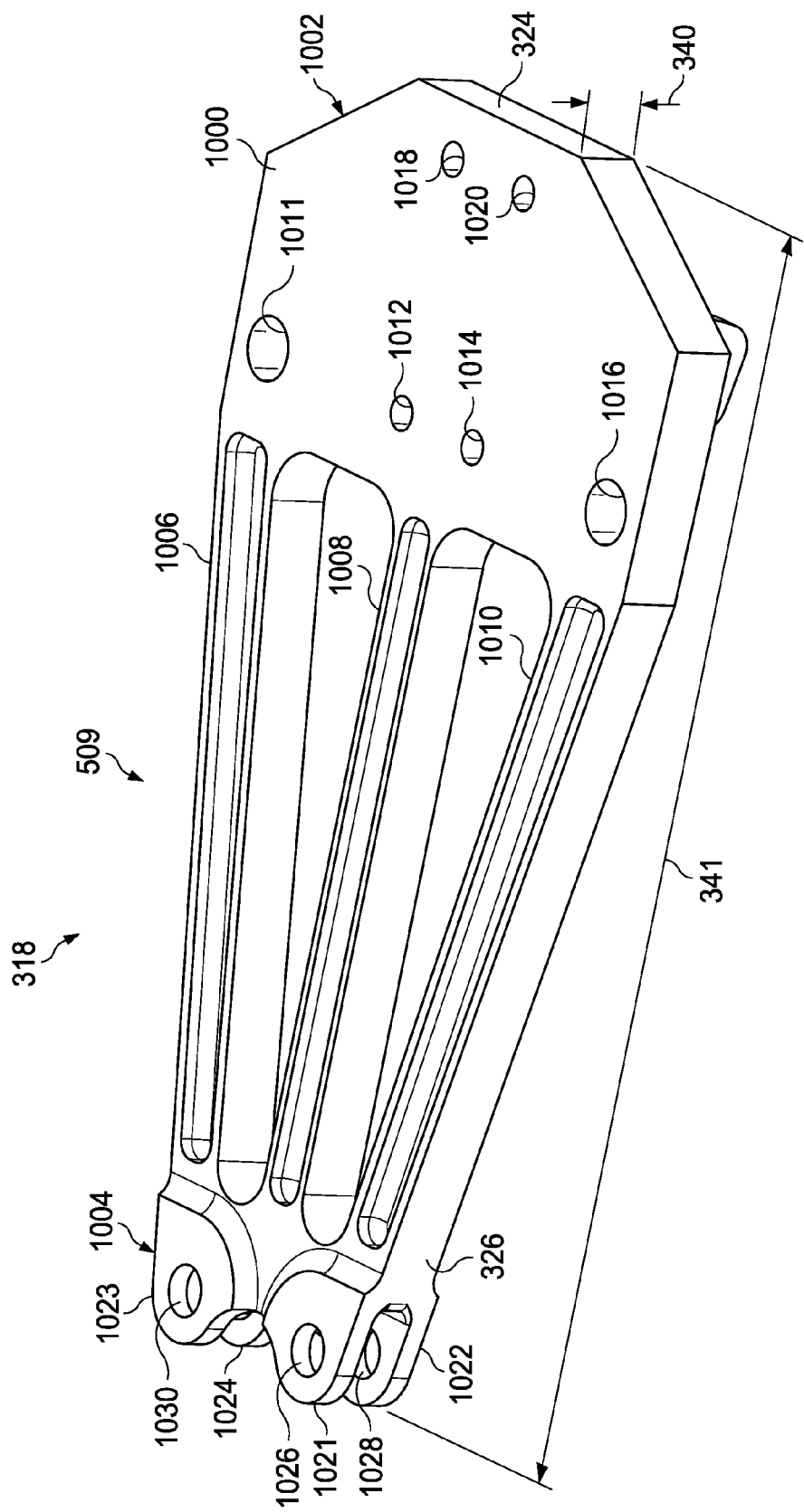
FIG. 10 is an illustration of a frame in accordance with an illustrative embodiment.

With reference now to FIG. 10, an illustration of a frame is depicted in accordance with an illustrative embodiment. A view of frame 318 from top side 1000 is depicted in accordance with an illustrative embodiment. In this illustrative example, first end 324 of frame 318 is configured to be connected to support structure 306 in FIG. 3.

As depicted, frame 318 may be comprised of connector section 1002, connector section 1004, and number of elongate members 509. Connector section 1004 may also be referred to as a "clevis". Number of elongate members 509 may extend from connector section 1002 to connector section 1004. In this illustrative example, number of elongate members 509 may comprise member 1006, member 1008, and member 1010.

The number of members present in number of elongate members 509 may vary, depending on the amount of redundancy desired within number of elongate members 509 for frame 318. For example, instead of having three members, number of elongate members 509 may comprise one member, two members, five members, or some other suitable number of members.

Connector section 1002 may be configured to be connected to second end 316 of support structure 306 in FIG. 3. In these illustrative examples, fasteners (not shown) may connect connector section 1002 at first end 324 to second end 316 of support structure 306. Fasteners may be installed in holes 1011, 1012, 1014, 1016, 1018, and 1020 in connector section 1002.

As depicted, connector section 1004 may have flange 1021, flange 1022, flange 1023, and flange 1024. In these illustrative examples, hole 1026 may be located in flange 1021, and hole 1028 may be located in flange 1022. These holes may receive fastener 608 to connect connector section 1004 to fixed link 604 in FIG. 6.

As depicted, hole 1030 may be located in flange 1023, and a hole (not shown) may be located in flange 1024. These holes may receive fastener 614 to connect connector section 1004 to floating link 606 in FIG. 6.

Figure 11:
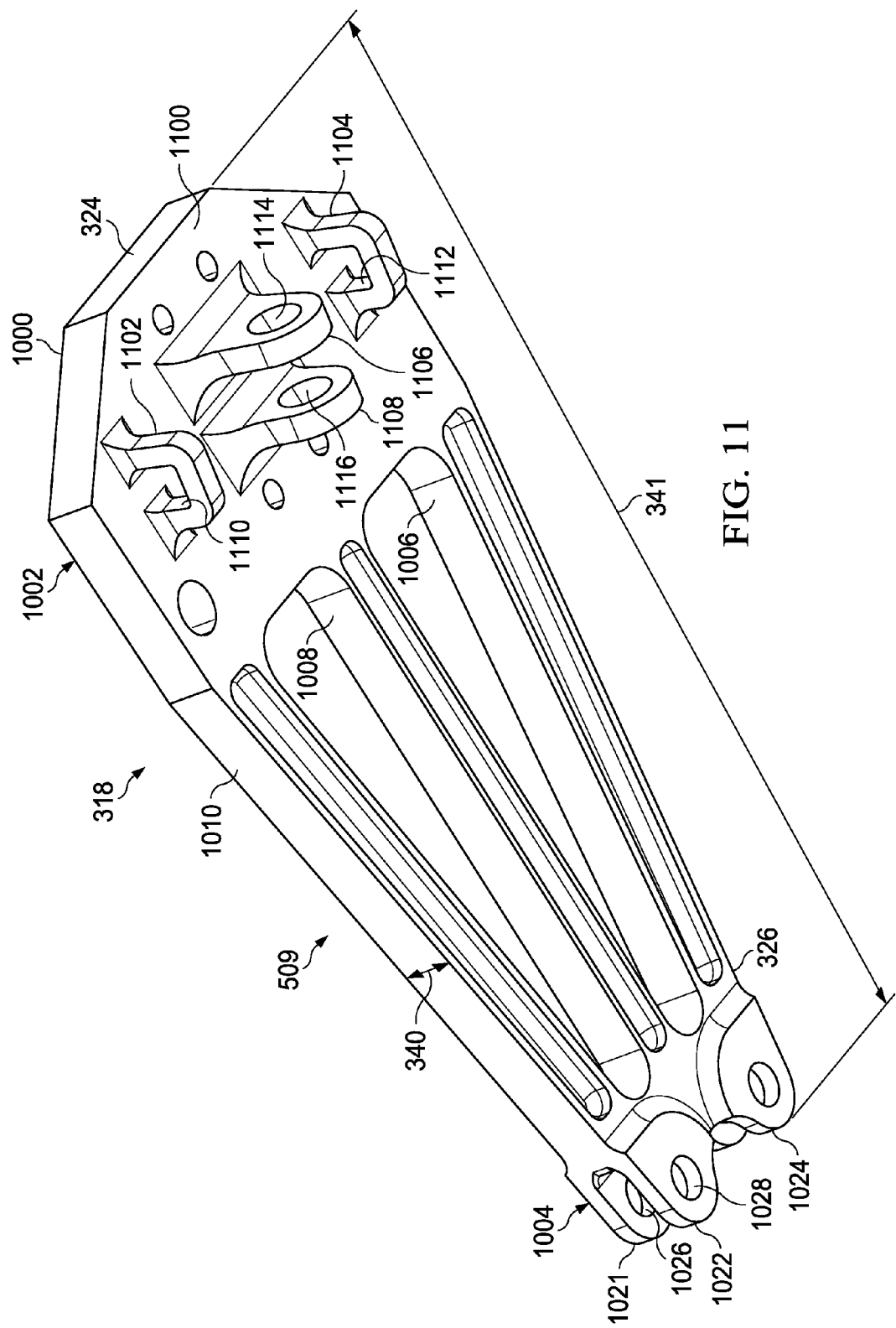
FIG. 11 is another view of an illustration of a frame in accordance with an illustrative embodiment.

Turning now to FIG. 11, another view of a frame is depicted in accordance with an illustrative embodiment. In this illustrative example, bottom side 1100 of frame 318 may be seen in this view.

As depicted, connector section 1002 may include flange 1102, flange 1104, flange 1106, and flange 1108. In these illustrative examples, hole 1110 in flange 1102 and hole 1112 in flange 1104 may receive bar 700 in FIG. 7. As depicted, flange 1106 and flange 1108 may be configured to receive a fastener to hold bar 700 in place. In particular, a fastener may be received in hole 1114 in flange 1106 and hole 1116 in flange 1108.

Figure 12:
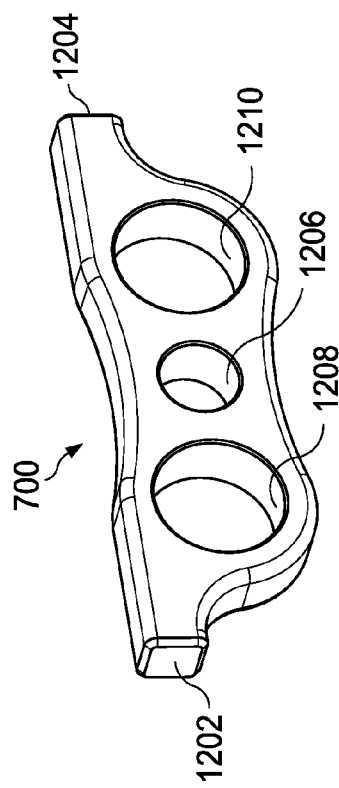
FIG. 12 is an illustration of a bar in accordance with an illustrative embodiment.

Turning now to FIG. 12, an illustration of a bar is depicted in accordance with an illustrative embodiment. In this depicted example, bar 700 may have end 1202 and end 1204. End 1202 may be configured to be received in hole 1110 of flange 1102 in FIG. 11. End 1204 may be configured to be received in hole 1112 of flange 1104 in FIG. 11. Hole 1206 may be aligned with hole 1114 in flange 1106 and hole 1116 in flange 1108 of frame 318 to receive a fastener to connect bar 700 to frame 318 in FIG. 11.

Hole 1208 in bar 700 may be used to connect link 618 in FIG. 6 to bar 700. Hole 1210 in bar 700 may be used to connect link 620 in FIG. 6 to bar 700. In the illustrative examples, bar 700 may allow both link 618 and link 620 to share loads.

Figure 13:
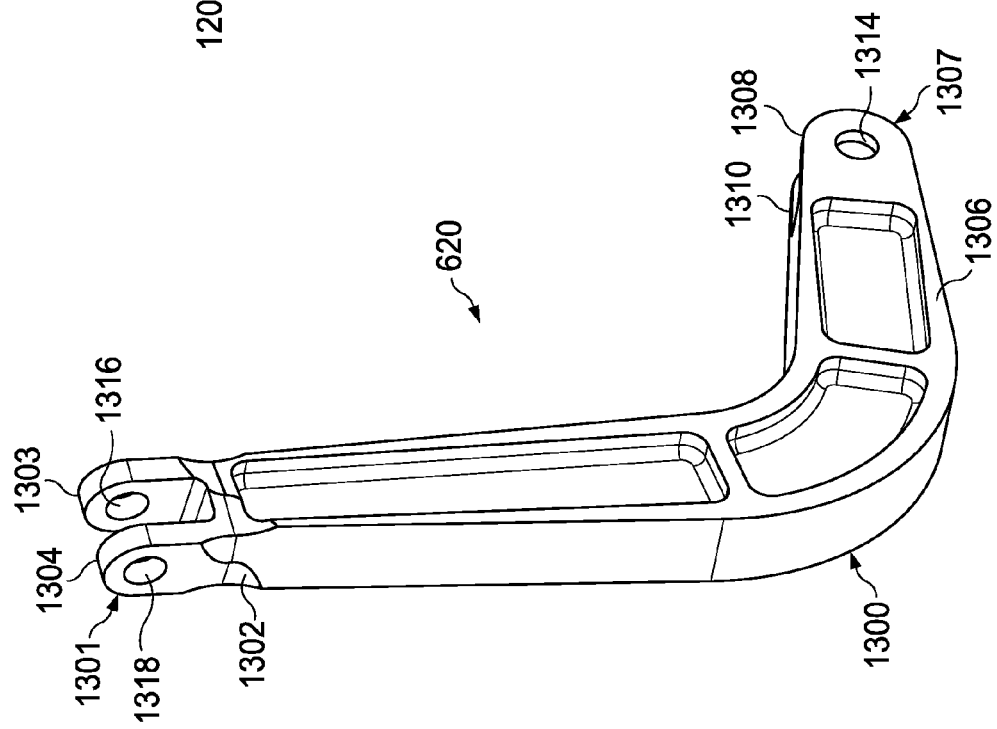
FIG. 13 is an illustration of a link in a second linking system in accordance with an illustrative embodiment.

With reference now to FIG. 13, an illustration of a link in a second linking system is depicted in accordance with an illustrative embodiment. In this view, link 620 may have curved shape 1300. Link 620 has connector 1301 at end 1302. In particular, connector 1301 may comprise flange 1303 and flange 1304. Link 620 also may have connector 1307 at end 1306. Connector 1307 may comprise flange 1308 and flange 1310.

As depicted, flange 1308 may have hole 1314, and flange 1310 has a hole (not shown). These holes may receive fastener 624 to connect link 620 to bracket 622 in FIG. 6.

In this illustrative example, flange 1303 may have hole 1316, and flange 1304 may have hole 1318. Hole 1316 and hole 1318 may receive fastener 704 to connect link 620 to bar 700 in FIG. 7. Although not shown, link 618 may have a configuration similar to link 620 as illustrated in FIG. 13.

Figure 14:
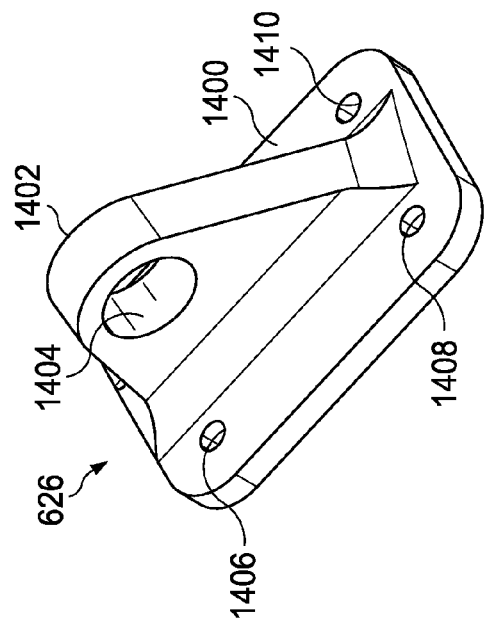
FIG. 14 is an illustration of a bracket in accordance with an illustrative embodiment.

With reference now to FIG. 14, an illustration of a bracket is depicted in accordance with an illustrative embodiment. In this depicted example, bracket 626 may include substantially planar section 1400 and flange 1402. Hole 1404 may be present in flange 1402. Hole 1404 may be aligned with hole 1314 in flange 1308 and a hole (not shown) in flange 1310 in FIG. 13 to receive fastener 702 to connect link 618 to bracket 626. In these illustrative examples, hole 1406, hole 1408, and hole 1410 may receive fastener 628 to connect bracket 626 to engine core case 304 in FIG. 3. In other illustrative examples, bracket 626 may be welded or formed as part of engine core case 304.

The different components shown in FIGS. 2-14 may be combined with components in FIG. 1, used with components in FIG. 1, or a combination of the two. Additionally, some of the components in FIGS. 2-14 may be illustrative examples of how components shown in block form in FIG. 1 can be implemented as physical structures.

Figure 15:
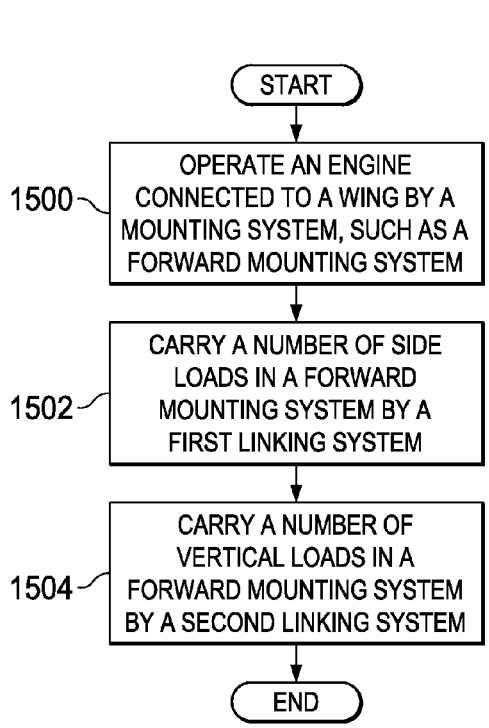
FIG. 15 is an illustration of a flowchart of a process for operating an engine in accordance with an illustrative embodiment.

Turning now to FIG. 15, an illustration of a flowchart of a process for operating an engine is depicted in accordance with an illustrative embodiment. The process illustrated in FIG. 15 may be implemented in aircraft 100 in FIG. 1.

The process may begin by operating engine 102 connected to wing 104 by a mounting system, such as forward mounting system 110 (operation 1500). Forward mounting system 110 may comprise frame 124, first linking system 126, and second linking system 128. First linking system 126 may be connected to frame 124 and fan case 116. Second linking system 128 may be connected to frame 124 and engine core case 118.

Number of side loads 141 may be carried by first linking system 126 in forward mounting system 110 (operation 1502). Number of side loads 141 may include one or more loads in a direction substantially parallel to pitch axis 146. Number of vertical loads 142 may be carried by second linking system 128 in forward mounting system 110 (operation 1504), with the process terminating thereafter. Number of vertical loads 142 may include one or more loads in a direction substantially parallel to yaw axis 148.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
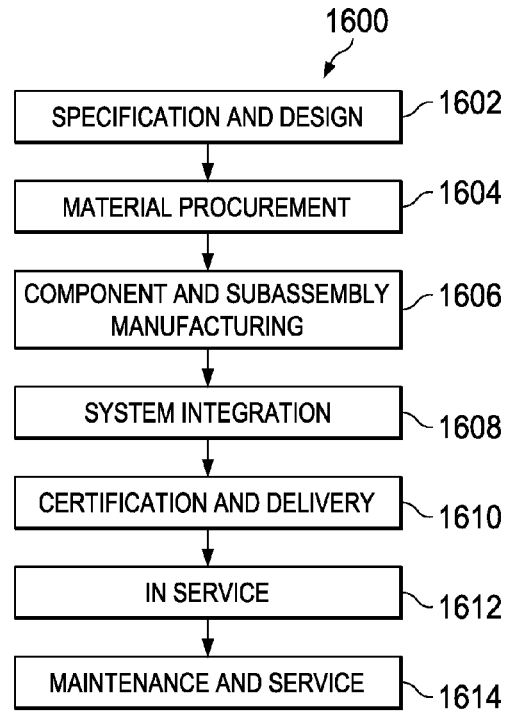
FIG. 16 is an illustration of an aircraft manufacturing and service method in accordance with an illustrative embodiment.
Figure 17:
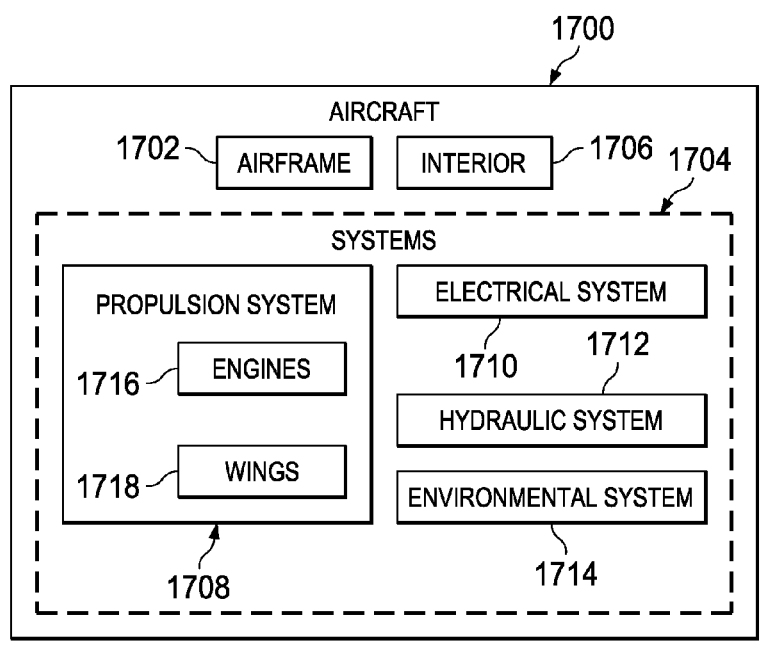
FIG. 17 is an illustration of an aircraft in which an illustrative embodiment may be implemented.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 may take place. Thereafter, aircraft 1700 may go through certification and delivery 1610 in order to be placed in service 1612. While in service 1612 by a customer, aircraft 1700 may be scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 may be produced by aircraft manufacturing and service method 1600 in FIG. 16 and may include airframe 1702 with plurality of systems 1704 and interior 1706.

Examples of systems 1704 may include one or more of propulsion system 1708, electrical system 1710, hydraulic system 1712, and environmental system 1714. Propulsion system 1708 may include engines 1716 connected to wings 1718 in airframe 1702. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16.

In one illustrative example, components or subassemblies for engine mounting system 106 produced in component and subassembly manufacturing 1606 in FIG. 16 may be fabricated or manufactured in a manner similar to components or subassemblies produced while aircraft 1700 is in service 1612 in FIG. 16.

In the illustrative examples, one or more apparatus embodiments, method embodiments, or a combination thereof for engine mounting system 106 may be manufactured during component and subassembly manufacturing 1606. Engine mounting system 106 may be used to mount engines 1716 in propulsion system 1708 to wings 1718 in airframe 1702.

Forward mounting system 110 in engine mounting system 106 may be used to connect engine 102 to wing 104 during system integration 1608. Further, forward mounting system 110 may be used to carry loads in loads 144 while in service 1612. Additionally, forward mounting system 110 may be added to aircraft 1700, and a more desirable configuration for a fairing may be used during maintenance and service 1614. This change may be performed as part of routine maintenance and service 1614 or as an upgrade or reconfiguration of aircraft 1700.

Thus, with one or more illustrative embodiments, engine mounting system 106 may be configured in a manner such that fairing 109 has desired configuration 164. In these illustrative examples, forward mounting system 110 may be configured to reduce length 122 of support structure 108 in a manner that allows for desired configuration 164 of fairing 109. In particular, a shape and size of fairing 109 may be provided that is more aerodynamic than if length 122 of support structure 108 is increased.

Desired configuration 164 for fairing 109 may occur through the use of frame 124, first linking system 126, and second linking system 128. These components may distribute loads 144 carried by forward mounting system 110 between fan case 116 and engine core case 118. The distribution of loads 144 may allow frame 124 to have configuration 160 that may reduce the height or profile of frame 124 in a manner that allows for desired configuration 164 of fairing 109. In these illustrative examples, frame 124 and first linking system 126 may carry side load 140. Second linking system 128 and frame 124 may carry vertical load 142.

Further, frame 124 may provide a common attachment location for first linking system 126 and second linking system 128. Frame 124 may allow for easier engine installation and/or removal.

The description of the different illustrative embodiments has been presented for purposes of illustration and description and is not intended to be exhaustive or limited to the embodiments in the form disclosed. Many modifications and variations may be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft engine mount apparatus that comprises:
    a frame that comprises a first connector section coplanar with and directly connected to elongate members directly connected to a second connector section, such that:
        the elongate members extend from the first connector section, along a length of an engine of an aircraft toward an inlet of the engine, to the second connector section; and
        the first connector section configured to directly connect to a support structure of the engine via openings that penetrate through a thickness of the first connector section;
    a first linking system that comprises a fixed link and a floating link such that each fixed and floating link directly connects to the second connector section and each fixed and floating link directly connects to a bracket on a fan case of the engine; and
    a second linking system that comprises a bar and a number of angular-shaped links that directly connect to the bar secured between a number of lugs and directly connected to an underside of the first connector section and wherein each opposing side of the number of angular-shaped links is pivotably connected to a number of brackets on an engine core case.

2. The aircraft engine mount apparatus of claim 1, further comprising the second connector section configured to be connected to the first linking system via two clevis elements.

3. The aircraft engine mount apparatus of claim 1 further comprising:
    the bracket on the fan case comprising a number of devises that extended upward from a circumference of the fan case.

4. The aircraft engine mount apparatus of claim 1 further comprising:
    the number of brackets on the engine core case each comprises: a substantially planar section, and a flange that comprises a hole.

5. The aircraft engine mount apparatus of claim 1, wherein the first linking system comprises:
    clevis elements that comprise flanges and connect with the second connector section via the fixed link and the floating link.

6. The aircraft engine mount apparatus of claim 1, wherein the frame comprises:
    the first connector section that comprises a top side that comprises openings, and a bottom side that comprises flanges that extend away from the bottom side; and
    the second connector section that comprises flanges, such that each flange respectively comprises a hole centered on an axis substantially perpendicular to a length of the frame.

7. The aircraft engine mount apparatus of claim 1, wherein the frame, the first linking system, and the second linking system are comprised of a number of materials selected from one of titanium, steel, and a steel alloy, and a distance between each elongate member being less near the second connector section than the distance between each elongate member near the first connector section.

8. The aircraft engine mount apparatus of claim 1, wherein the frame, the first linking system, and the second linking system form a forward mounting system for connecting the support structure to the engine.

9. The aircraft engine mount apparatus of claim 1, wherein the first linking system is configured to carry a number of side loads in a direction that is substantially perpendicular to an axis extending centrally through the fan case.

10. The aircraft engine mount apparatus of claim 1, wherein the second linking system is configured to carry a number of vertical loads in a direction substantially perpendicular to an axis extending centrally through the fan case.

11. The aircraft engine mount apparatus of claim 5, further comprising the floating link having fasteners of a variety of sizes.

12. The aircraft engine mount apparatus of claim 9, wherein a side load in the number of side loads is in a direction that is substantially parallel to a pitch axis through the aircraft.

13. The aircraft engine mount apparatus of claim 10, wherein a vertical load in the number of vertical loads is in a direction that is substantially parallel to a yaw axis through the aircraft.

14. A method for operating an engine, the method comprising:
    operating the engine connected to a wing of an aircraft by a mounting system comprising:
        a frame, a first linking system connecting the frame to a fan case in the engine, and a second linking system connecting the frame to an engine core case in the engine, the frame comprising:
            a first connector section coplanar with and directly connected to elongate members directly connected to a second connector section, the elongate members extending from the first connector section to the second connector section;
        the first linking system comprising a fixed link and a floating link, each fixed link and floating link directly connecting the second connector section to the fan case in the engine;
        the second linking system comprising: a bar, and a number of angular-shaped links directly connecting to the bar, secured between a number of lugs and directly connecting to an underside of the first connector section, and connecting the first connector section to the engine core case in the engine, such that each link in the number of links comprises an angular shape, each opposing side of the number of links pivotably connecting to a number of brackets on the engine core case;
    directly connecting, via openings that penetrate through a thickness of the first connector, the first connector section to a support structure on the wing with the elongate members extending toward an inlet of the engine;
    carrying a number of side loads using the first linking system; and
    carrying a number of vertical loads using the second linking system.

15. The method of claim 14, wherein the step of carrying the number of side loads using the first linking system comprises:
    carrying the number of side loads using the first linking system and the frame.

16. The method of claim 14, wherein the step of carrying the number of side loads using the first linking system comprises:
  carrying the number of side loads using the first linking system and the frame, wherein a bracket is configured to connect the first linking system to the fan case.

17. The method of claim 14, wherein the step of carrying the number of vertical loads using the second linking system comprises:
  carrying the number of vertical loads using the second linking system, wherein the bar is configured to connect the second linking system to a bottom side of the frame.

18. The method of claim 14, wherein the step of carrying the number of vertical loads using the second linking system comprises:
  carrying the number of vertical loads using the second linking system, wherein a number of brackets is configured to connect the second linking system to the engine core case.

19. The method of claim 14, wherein the first linking system comprises clevis elements that comprise flanges and connect with the second connector section via the fixed link and the floating link.

20. The method of claim 14, further comprising the frame, the first connector section, the second connector section, and the elongate members comprising a number of materials selected from one of titanium, steel, and a steel alloy, and a distance between each elongate member being less near the second connector section than the distance between each elongate member near the first connector section.

21. The method of claim 14 further comprising:
  carrying a number of thrust loads using the second linking system.

22. The method of claim 14, wherein the mounting system is a forward mounting system configured to connect an engine pylon to the engine.

23. The method of claim 14 further comprising:
  reducing drag during operation of the engine using a fairing comprising a smaller fairing than a fairing required when mounting the engine without applying the method of claim 14; and
  the smaller fairing covering the mounting system and the support structure connected to the engine by the mounting system.

24. An aircraft engine mounting system that comprises:
  a frame configured to be connected to a support structure in an engine pylon for an engine of an aircraft in which the frame has a first end directly connected to the support structure for the engine and a second end configured to be connected to a first linking system, such that the frame comprises a first connector section at the first end of the frame; a second connector section at the second end of the frame; and a number of elongate members that extend between and directly connect to the first connector section and the second connector section;
  the first connector section comprising openings, configured to directly connect the first connector section to a support structure for the engine, that penetrate through a thickness of the first connector;
  the first linking system connected to the frame and directly connected to a bracket on a fan case in the engine, such that the elongate members extend, from the first end toward an inlet of the engine and coplanar to the first end, to the second end, and the first linking system comprises a fixed link and a floating link, each fixed link and floating link configured to carry a number of side loads in a first direction that is substantially parallel to a pitch axis through the aircraft; and
  a second linking system directly connected to the frame and comprising a bar, and a number of angular-shaped links, directly connected to the bar, secured between a number of lugs and directly connecting to an underside of the first connector section, and to a number of brackets on an engine core case in the engine such that the second linking system is configured to carry a number of vertical loads in a second direction that is substantially parallel to a yaw axis through the aircraft.

25. A method for operating an engine, the method comprising:
  operating the engine connected to an engine pylon of a wing of an aircraft by a forward mounting system comprising:
    a frame comprising: a first end, a second end, a top side, and a bottom side;
    a first linking system comprising a fixed link and a floating link, each fixed link and floating link directly connecting to the frame and to a bracket on a fan case in the engine; and
    a second linking system comprising a bar secured between a number of lugs and directly connected to an underside of a first connector section, and a number of angular-shaped links directly connecting to the bottom side of the frame and a number of brackets on an engine core case in the engine;
  connecting the top side of the first end to a support structure for the engine and to the second end to the first linking system, such that the frame comprises a first connector section at the first end; a second connector section at the second end; and a number of elongate members extending between and connecting the first connector section to the second connector section such that with the first end connecting to the support structure, via openings that penetrate through a thickness of the first connector section, the elongate members extend, toward an inlet of the engine, coplanar to and from the first end, to the second end;
  carrying a number of side loads using the first linking system; and
  carrying a number of vertical loads using the second linking system.

* * * * *